United States Patent
Lisec

(10) Patent No.: US 7,402,096 B2
(45) Date of Patent: Jul. 22, 2008

(54) DEVICE FOR MACHINING MATERIAL PLATES

(76) Inventor: Peter Lisec, Bahnhofstr. 34, A-3363 Amstetten-Hausmening (AT)

( * ) Notice: Subject to any disclaimer, the term of this patent is extended or adjusted under 35 U.S.C. 154(b) by 220 days.

(21) Appl. No.: 10/481,472

(22) PCT Filed: Dec. 19, 2002

(86) PCT No.: PCT/AT02/00360

§ 371 (c)(1),
(2), (4) Date: Apr. 6, 2005

(87) PCT Pub. No.: WO2004/048052

PCT Pub. Date: Jun. 10, 2004

(65) Prior Publication Data

US 2005/0178257 A1 Aug. 18, 2005

(30) Foreign Application Priority Data

Nov. 22, 2002 (AT) .............................. A 1759/2002

(51) Int. Cl.
B24B 7/00 (2006.01)
B26F 3/00 (2006.01)
(52) U.S. Cl. .............................. 451/69; 451/54; 83/177
(58) Field of Classification Search .................... 451/54, 451/69; 83/22, 24, 98, 177, 53
See application file for complete search history.

(56) References Cited

U.S. PATENT DOCUMENTS

| 3,978,748 | A | * | 9/1976 | Leslie et al. | 83/177 |
| 4,092,889 | A | * | 6/1978 | Fisher | 83/177 |
| 4,366,950 | A | * | 1/1983 | Hamasaki | 266/49 |
| 4,423,568 | A | * | 1/1984 | Gould | 451/178 |
| 4,458,660 | A | * | 7/1984 | Vlk et al. | 451/56 |
| 4,685,180 | A | | 8/1987 | Kitaya et al. | |
| 4,827,679 | A | * | 5/1989 | Earle, III | 83/177 |
| 4,872,293 | A | * | 10/1989 | Yasukawa et al. | 83/177 |
| 5,117,366 | A | * | 5/1992 | Stong | 451/30 |
| 5,211,156 | A | * | 5/1993 | Jurewicz et al. | 125/1 |
| 5,291,694 | A | * | 3/1994 | Hosoya et al. | 451/54 |
| 5,605,492 | A | * | 2/1997 | Klingel | 83/177 |
| 5,868,603 | A | * | 2/1999 | Allaire et al. | 451/44 |

(Continued)

FOREIGN PATENT DOCUMENTS

DE 42 17 157 A1 11/1993

(Continued)

Primary Examiner—Jason Prone
(74) Attorney, Agent, or Firm—Young & Thompson

(57) ABSTRACT

A device for working of glass panes (1) has a support (5) for the glass panes (1) and a nozzle (2) from which a water jet emerges for cutting the glass panes (1). The nozzle (2) can be moved on a guide (8) parallel to the plane of the support (5). The tool (12) for working of the cut edges of the material plates (1) can likewise be moved on the guide (8) of the nozzle (2) and is preferably mounted on the same carriage (9) which can be moved on the guide (8), as the nozzle (2). This simplifies not only the technical structure of the device, but also shortens the working time, since the glass pane (1) need not be transported to another device for finishing. Moreover, essentially the same control program as for the water jet cutting can be used for finishing.

5 Claims, 3 Drawing Sheets

U.S. PATENT DOCUMENTS

| | | | | |
|---|---|---|---|---|
| 5,980,372 | A * | 11/1999 | Spishak | 83/177 |
| 6,095,897 | A * | 8/2000 | Stocker et al. | 451/5 |
| 6,103,049 | A * | 8/2000 | Batdorf | 83/177 |
| 6,125,729 | A * | 10/2000 | Mirabello | 83/177 |
| 6,222,155 | B1 * | 4/2001 | Blackmon et al. | 219/121.39 |
| 6,327,948 | B1 * | 12/2001 | Tuori | 83/177 |
| 6,565,420 | B2 * | 5/2003 | Lisec | 451/39 |
| 6,634,928 | B2 * | 10/2003 | Erickson et al. | 83/177 |
| 6,643,882 | B1 * | 11/2003 | Sotozaki et al. | 451/65 |
| 6,712,671 | B2 * | 3/2004 | Wallendorf et al. | 451/11 |
| 6,852,187 | B2 * | 2/2005 | Yanagita et al. | 83/177 |
| 7,074,112 | B2 * | 7/2006 | Olsen | 451/11 |
| 2001/0018313 | A1 | 8/2001 | Lisec | |
| 2005/0011229 | A1 * | 1/2005 | Lisec | 65/182.2 |
| 2005/0126882 | A1 * | 6/2005 | Lisec | 198/345.1 |
| 2006/0288838 | A1 * | 12/2006 | Lisec | 83/879 |

FOREIGN PATENT DOCUMENTS

| | | |
|---|---|---|
| DE | 100 51 942 A1 | 5/2002 |
| EP | 0 983 827 A1 | 3/2000 |
| EP | 1 076 044 A1 | 2/2001 |
| EP | 1 172 189 A2 | 1/2002 |
| GB | 2 181 376 A | 4/1987 |
| WO | WO 2004/048052 * | 6/2004 |

\* cited by examiner

DEVICE FOR MACHINING MATERIAL PLATES

FIELD OF THE INVENTION

The invention relates to a device for working of material plates, such as glass panes, with a support means for the material plate and with a nozzle from which a water jet emerges for cutting the material plates, and the nozzle can be moved on a guide parallel to the plane of the support means.

BACKGROUND OF THE INVENTION

Such a device is known for example from DE 100 51 942 A1. The cut edges of the material plates or glass panes must then be further worked, especially ground and polished, for which they are conveyed to another workstation. In this other workstation the glass panes must be exactly positioned relative to the tool so that this finishing can be precisely carried out. This is associated not only with high technical cost, but also lost time, since the glass pane must not only be moved to another workstation, but must also be positioned there.

OBJECT OF THE INVENTION

The object of the invention is therefore to be able to finish the cut edges which have been produced by the water jet faster and more easily.

SUMMARY OF THE INVENTION

The tool for working of the cut edges can be moved on the same guide as the nozzle. This simplifies not only the technical structure of the device, but also shortens the working time, since the glass pane need not be transported to another device for finishing. Moreover, essentially the same control program as for the water jet cutting can be used for finishing.

Even if within the framework of the invention it is possible for the nozzle and the tool to be movable on separate carriages on a common guide, it is preferably in the invention if the nozzle and the tool are mounted on a common carriage which can be moved on the guide. This simplifies the technical structure of the device since only one single drive need be used for the nozzle and the tool.

The invention is used preferably in essentially vertically standing support means, as is known for example from DE 100 51 942 A1. Accordingly, in one preferred embodiment of the invention it can be provided that the nozzle be located on the side opposite the supporting surface of the support means and that in the support wall there is a recess behind which there is a water-filled chamber which can be moved on a second guide synchronously to the nozzle.

It is possible in the invention for there to be another tool for working the cut edges of the material plate, which tool can be moved on the guide of the water-filled chamber. This additional tool can enable either working of the glass pane on its side facing the support means; this is not possible from the front under certain circumstances. Alternatively or in addition this additional tool however can also be a second tool set which can be used when the first tool can no longer be used due to wear or breakage. In this way the intervals in which the tools must be changed can be lengthened, which also reduces the downtime of the machine. But basically it is also conceivable for there to be one tool only on the guide of the water-filled chamber and for there not to be a tool on the guide of the nozzle.

There can also be a second tool, which can be moved on the guide of the water-filled chamber, on a common carriage with the nozzle which can be moved on the guide. Here the construction effort for the drive can also be simplified.

BRIEF DESCRIPTION OF THE DRAWINGS

One preferred embodiment of the invention is detailed below with reference to the attached drawings.

DETAILED DESCRIPTION OF THE INVENTION

Figure 1:
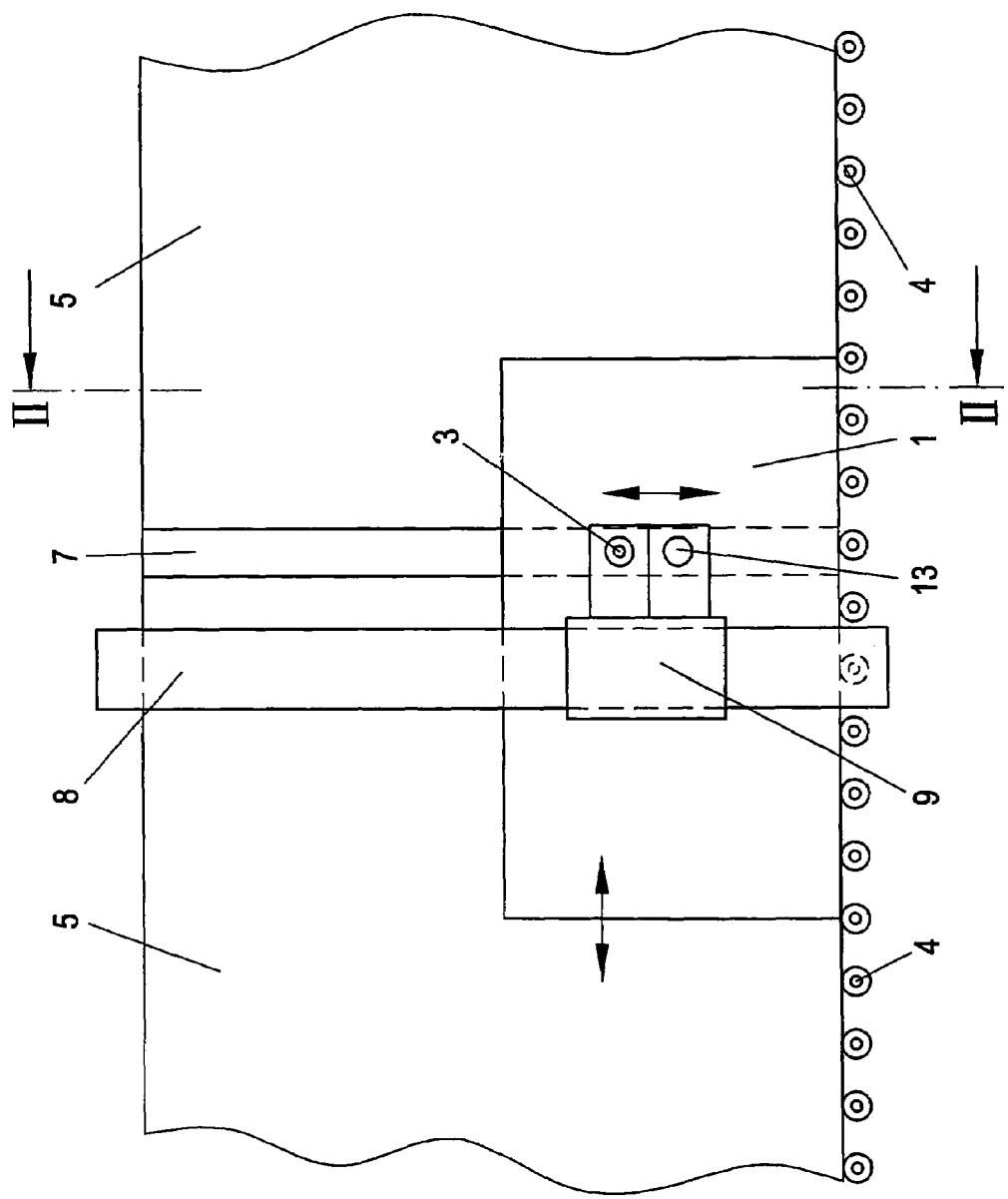
FIG. 1 shows a front view of the device as claimed in the invention.

FIG. 1 shows a device as claimed in the invention in which a material plate, for example a glass pane 1, roughly vertically standing, adjoins the support means or the support wall 5. The support wall 5 is located on the machine frame 6 and the plane of the support wall 5 is tilted slightly, preferably between three and eight degrees, relative to vertical. The glass pane 1 stands on a horizontal conveyor which is formed by conveyor rollers 4 in this embodiment. These support means 5 are known in the prior art as roll arrays, roller arrays, or air cushion walls, especially as part of insulating glass production plants. The same applies to the most varied embodiments of horizontal conveyors.

The support means or support wall 5 is interrupted by a recess in the form of a vertically running slit 7. In the area in front of or directly next to the slit 7 there are vertically aligned guides 8 and 11 in front of and behind the support wall. On the guide 8 which is located in front of the support wall 5, i.e. on the side of the support wall 5 which adjoins the glass pane 1, a nozzle 2 can move which is supplied via a connection 3 with water under high pressure to which abrasive particles can be added, from a conventional high pressure pump which is therefore not described. By successively or simultaneously moving the nozzle 2 on the guide 8 and moving the glass pane 1 along the horizontal conveyor 4, cuts of any configuration on the pane 1 can be produced by the water jet.

Figure 2:
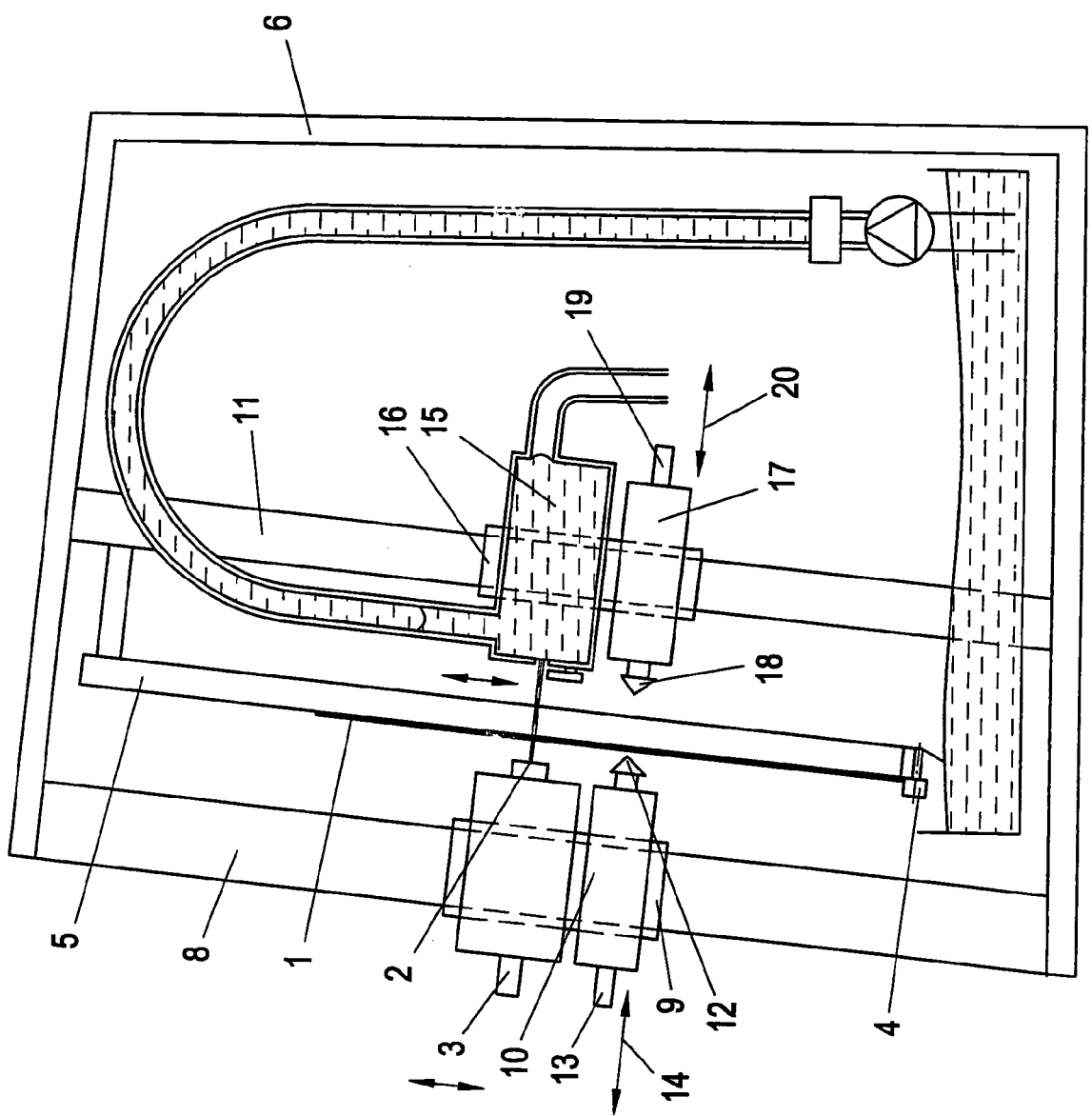
FIG. 2 shows a section through the device from FIG. 1 along line II-II.

The nozzle 2 can be moved on a carriage 9 on the guide 8. On this carriage 9 there is furthermore a drive 10 for a tool 12 which is a grinding cone in the embodiment shown in FIG. 2. The tool 12 is mounted on a tool spindle 13 which can be moved forward and backward along the double arrow 14. Using the tool 12, for example round recesses which have been produced using the nozzle 2 or the water jet can be countersunk. Instead of a grinding cone however also grinding wheels or polishing wheels can be mounted on the tool spindle 13 for finishing the cut edges.

On the guide which is located on the back of the support wall 5 there is a water-filled chamber 15 which the water jet enters in order to avoid unwanted spray mist formation, reflection of the water jet with the abrasive particles onto the back of the glass pane 1, and unwanted noise development. The water-filled chamber 15 can be moved up and down on the carriage 16 synchronously to the nozzle 2. On the carriage 16 furthermore a second drive 17 for a second tool 18 is mounted, and the tool 18 in turn can be moved forward and backward on the spindle 19 in the direction of the double arrow 20. With the tool 18, in the same way as with the tool 12, from the back for example openings can be countersunk or edges which run in any manner can be ground. Instead of the grinding tool 18 in turn for example grinding wheels or polishing wheels can also be used. Basically it is also possible for there to be either only the tool 12 or only the tool 18 or two tools 12 and 18.

Even if it is possible within the framework of the invention for the chamber 15 and the tool 18 to be movable on separate carriages on the common guide 11, in the invention it is also preferable here if the chamber 15 and the tool 18 are mounted on a common carriage 16 which can be moved on the guide 11.

Since the tools 12 and 18 are mounted directly on the carriages 9 and 16 of the nozzle 2 and the chamber 15, the tools 12 and 18 do not require their own translational drive. Furthermore it is relatively simple to use the motion control of the nozzle 2, of the chamber 15 and of the horizontal conveyor 4, after the corresponding coordinate correction, for controlling the motion of the tools 12 and 18.

Operation can proceed for example such that by simultaneously moving the nozzle 2 and the chamber 15 with the horizontal conveyor 4 a circular opening is cut out of the glass pane 1. During these working processes the tools 12 and 18 are in their retracted position which is thus away from the glass pane 1. After completion of cutting the carriages 9 and 16 are moved up essentially by the axial distance of the nozzle 2 and the spindle 12 and 18 and in succession the grinding cones 12 and 18 are moved to the glass pane 1 until the cut edges have been broken or countersunk to the desired degree on both sides. If the opening is larger than the greatest working diameter of the grinding cones 12 and 18, the contour of the cut edge must be followed by the correspondingly coordinated, simultaneous movement of the carriages 9 and 16 and of the horizontal conveyor 4.

Figure 3:
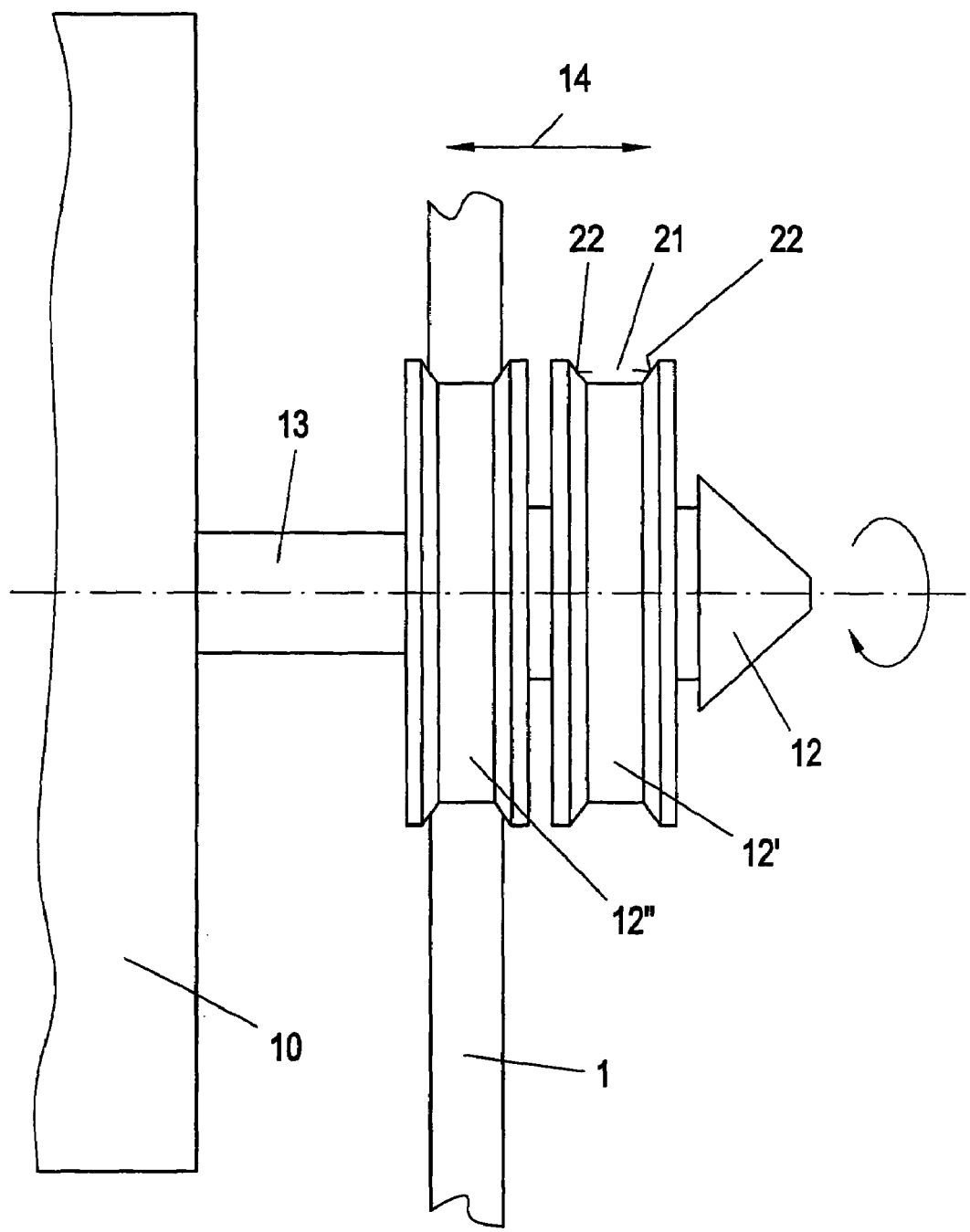
FIG. 3 shows a detailed schematic view of a tool which can be used in the device as claimed in the invention.

FIG. 3 shows the drive 10 in part again on an enlarged scale, with a tool which consists of a combination of a grinding cone 12, a grinding wheel 12' and a polishing wheel 12". In this way it is possible to carry out different operations with a combination tool. The tool 18 which is located behind the support wall 5 can be made accordingly.

Since the grinding wheel 12' has a recess 21 with inclined flanks 22, with the grinding wheel 12' the cut edges can be both ground on the face and can also be bevelled on their edges. But since the grinding wheel 12' due to its width is suited essentially only for a certain thickness of the glass plates 1, adaptation to the thickness of the glass pane 1 can be carried out by the corresponding tilting of the grinding wheel 12' relative to the glass pane. To do this, in the device as claimed in the invention it can be furthermore provided that the drive 10 can be inclined to the plane of the glass pane 1 by the corresponding drives. Basically it is also possible, for example on the front, to provide a grinding wheel 12' with a greater width, therefore for thicker glass slabs, and on the second or rear drive 17 to provide a grinding wheel with a smaller width for glass plates which have a smaller thickness.

The invention claimed is:

1. A device for working a material plate comprising a means for supporting the material plate, a nozzle from which a water jet emerges for cutting the material plate, wherein the nozzle can be moved on a first guide parallel to a plane of the supporting means, and a first tool for working cut edges of the material plate, wherein the first tool can be moved on the first guide, and wherein the first tool incorporates a grinding cone, and/or a grinding wheel, and/or a polishing wheel, wherein the nozzle is located on a side opposite a supporting surface there is a recess behind which there is a water-filled chamber which can be moved on a second guide synchronously to the nozzle, and further comprising a second tool for working cut edges of the material plate, wherein the second tool can be moved on the second guide.

2. The device as claimed in claim 1, wherein the nozzle and the first tool are mounted on a common carriage which can be moved on the first guide.

3. The device as claimed in claim 1, wherein the supporting means is tilted between three and eight degrees, relative to vertical.

4. The device as claimed in claim 1, wherein the water-filled chamber and the second tool are mounted on a common carriage which can be moved on the second guide.

5. The device as claimed in claim 1, wherein the first tool is mounted on a tool spindle which can be moved in the direction of an axis of rotation of the tool spindle.

* * * * *